Feb. 23, 1932.  J. S. SHAW ET AL  1,846,160
SPEED CHANGING AND SPEED REDUCING GEAR
Filed March 31, 1930  6 Sheets-Sheet 1
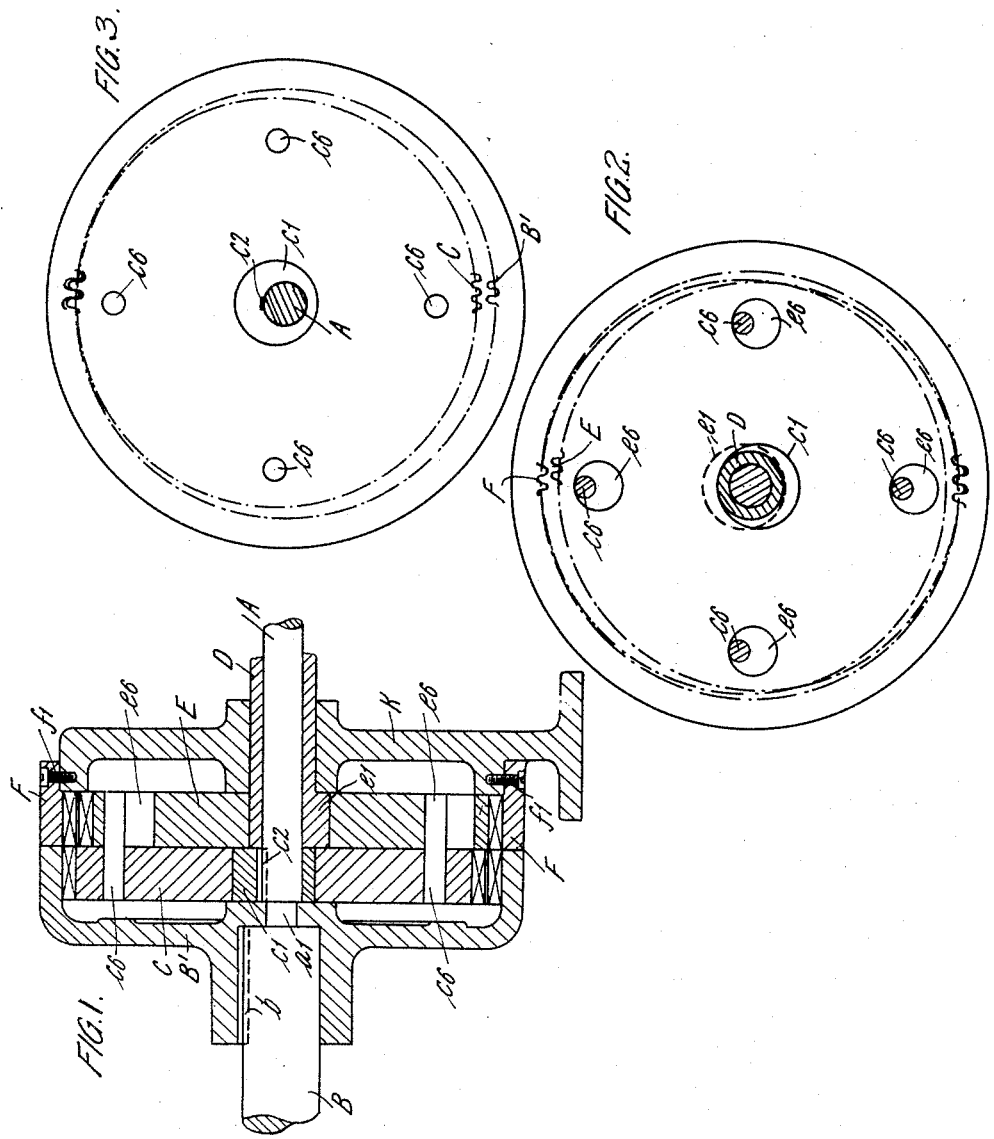

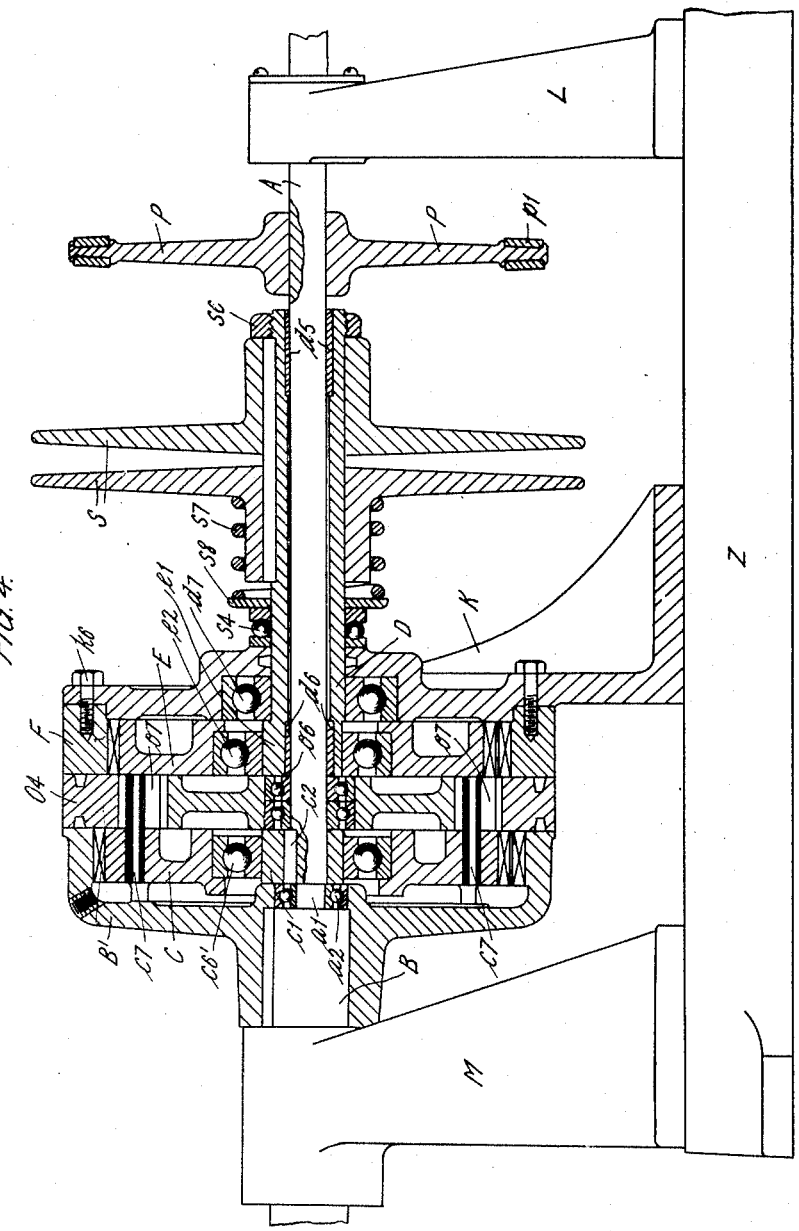

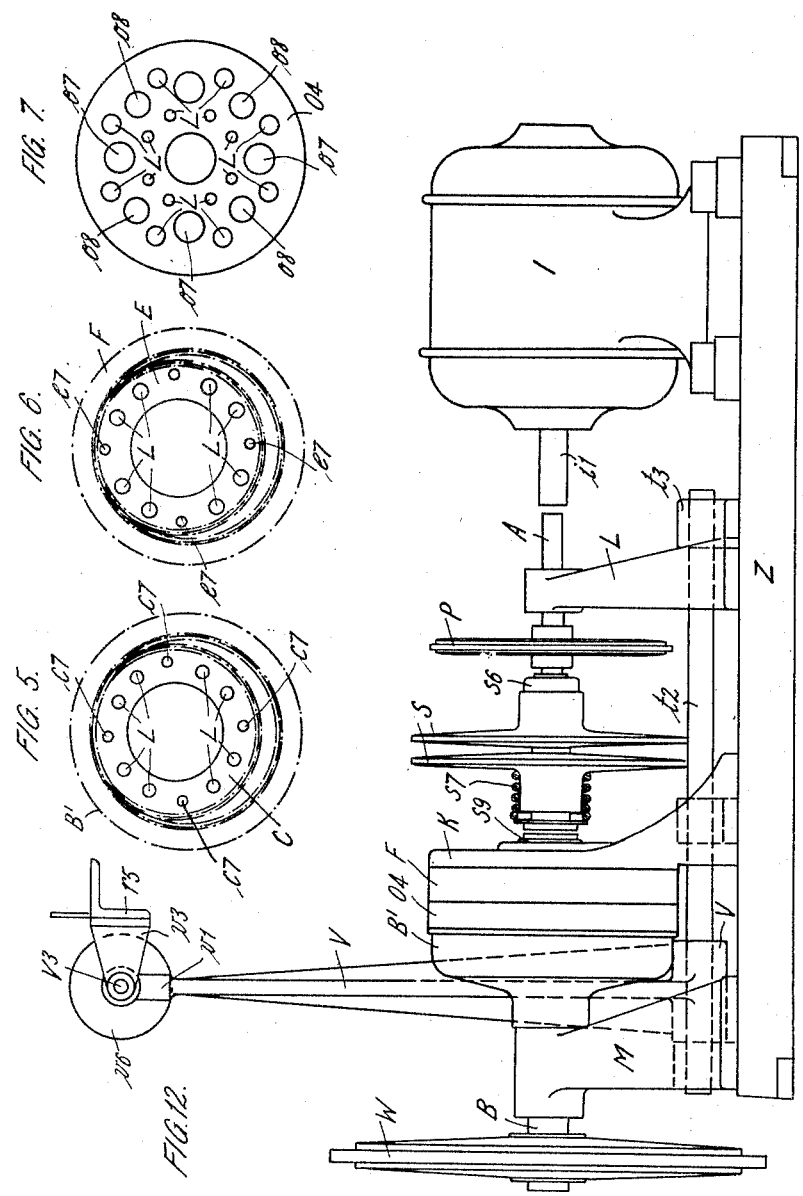

Feb. 23, 1932. J. S. SHAW ET AL 1,846,160
SPEED CHANGING AND SPEED REDUCING GEAR
Filed March 31, 1930 6 Sheets-Sheet 4
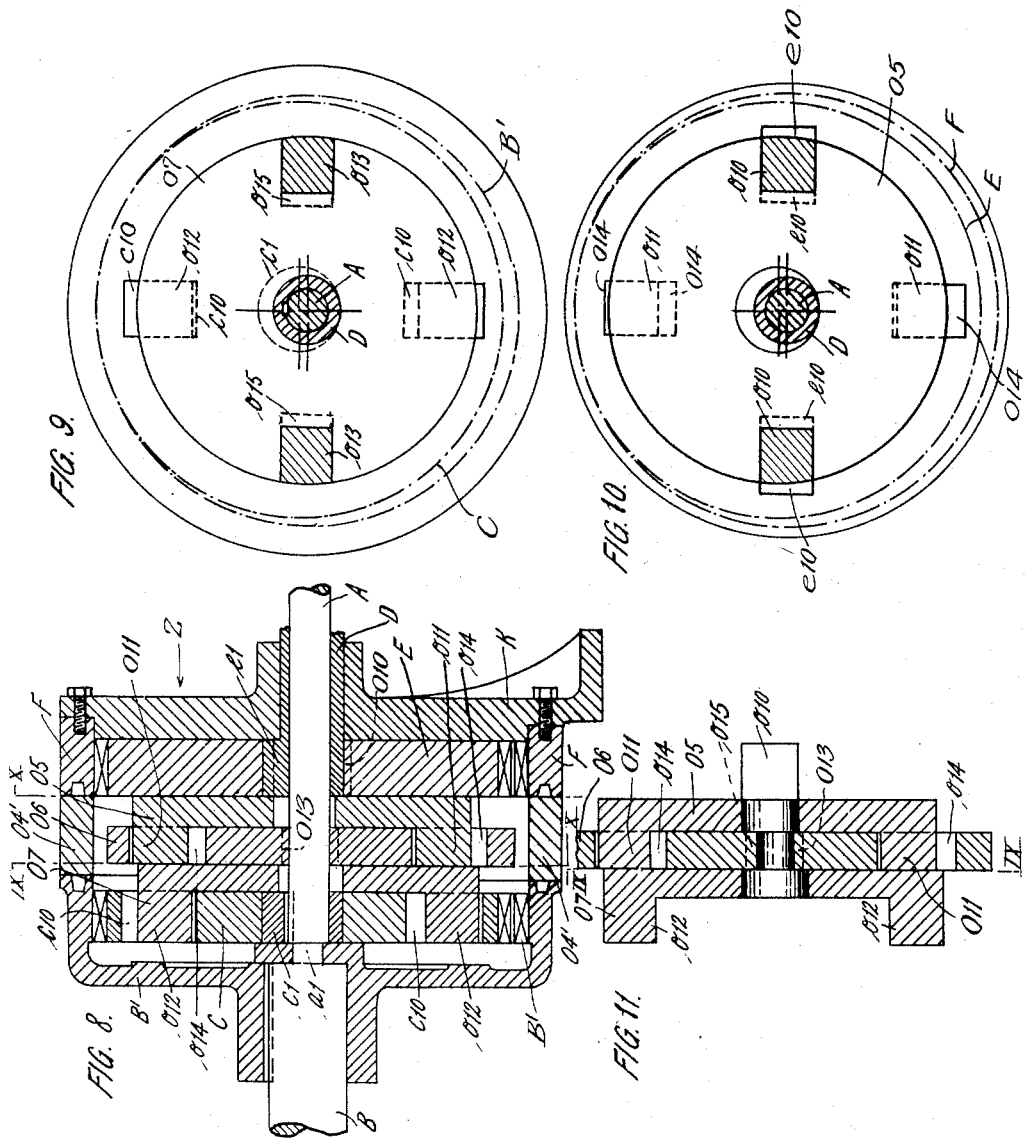

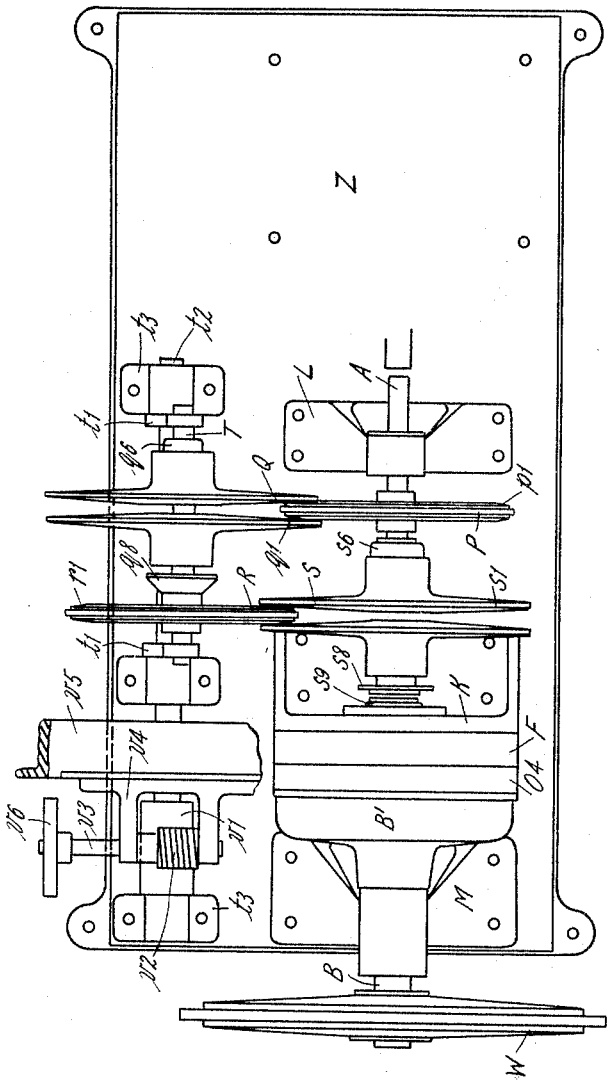

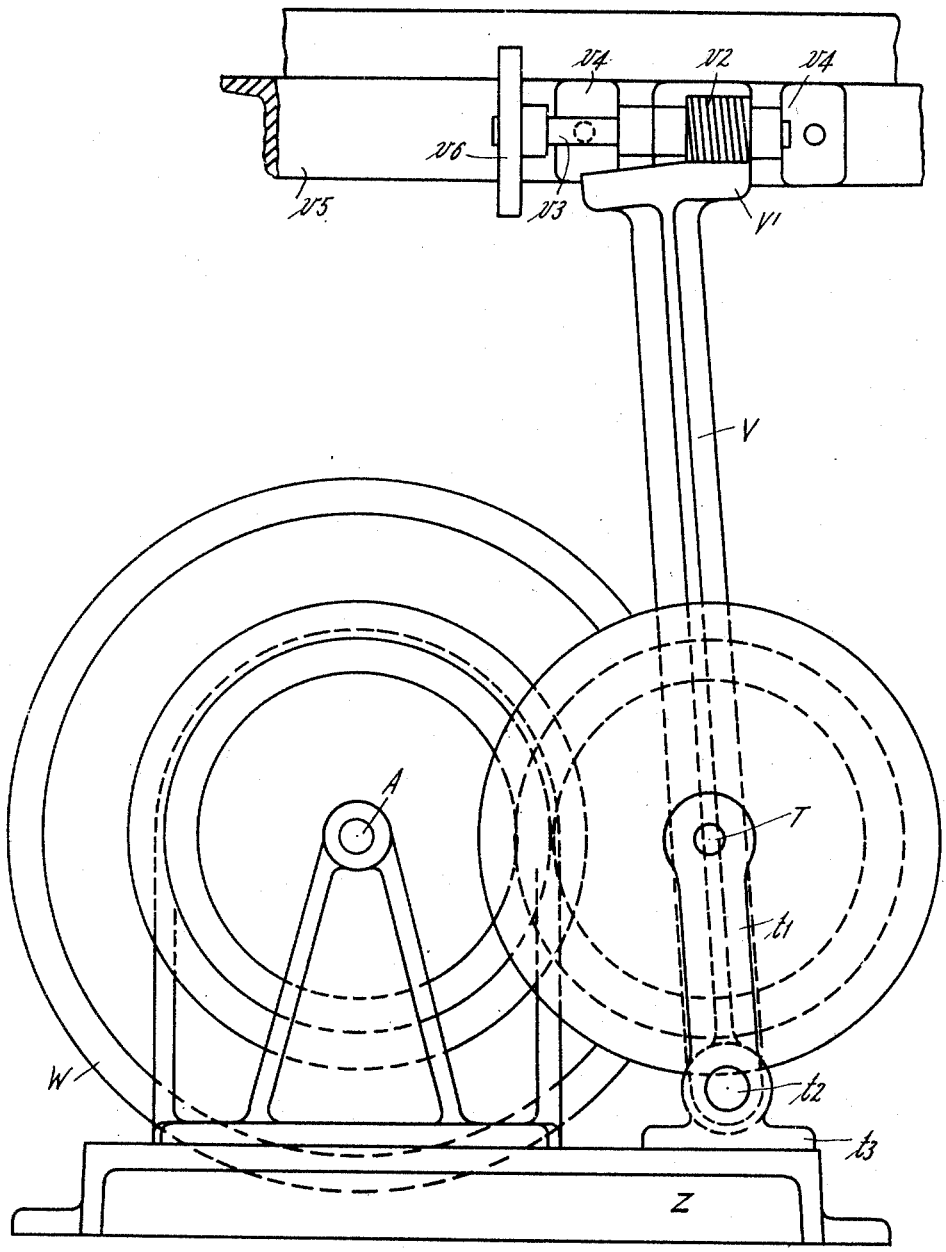

Patented Feb. 23, 1932

1,846,160

UNITED STATES PATENT OFFICE

JOHN STANDEN SHAW AND WALTER HEAP, OF LIVERPOOL, ENGLAND

SPEED CHANGING AND SPEED REDUCING GEAR

Application filed March 31, 1930, Serial No. 440,315, and in Great Britain April 4, 1929.

This invention relates to speed-changing and speed reducing gear, and the object is to provide a simple, efficient and inexpensive gear by which the speed of a shaft may be varied in continuous manner, and be reversed, and in which a comparatively large speed reduction may be obtained.

We have illustrated our invention in the accompanying drawings, in which:—

Figs. 1 to 3 illustrate a simple form of the invention adapted for the purposes of description; the secondary speed changing gear, and bearing brackets and casing are omitted.

Fig. 1 is a sectional elevation.

Fig. 2 an end elevation with the bracket K removed, and

Fig. 3 an elevation with the bracket K, and the wheels E and F removed.

Figs. 4, 5, 6 and 7 illustrate a modification and show the end bearing brackets and two elements of the secondary speed changing gear more fully illustrated in Figs. 8 to 11.

Fig. 4 is an elevation with gear in section.

Fig. 5 is an end elevation viewed from right to left with all parts removed except the wheels C and B'.

Fig. 6 is an end elevation viewed from left to right with all parts removed except the wheels E and F.

Fig. 7 is an end view of the intermediate member O4.

Figs. 8, 9, 10 and 11 illustrate the preferred form of the gear.

Fig. 8 is a sectional elevation.

Fig. 9 is an end elevation viewed in the direction of the arrow Z the plane of section being taken on the line IX, IX.

Fig. 10 is an end elevation viewed in the direction of the arrow Z, the plane of section being taken on the line X, X.

Fig. 11 is a sectional elevation of the two Oldham couplings O5 and O7 and the intermediate member O6.

Figs. 12, 13 and 14 show the general arrangement of the preferred form.

Fig. 12 is an elevation in outside view, to a reduced scale.

Fig. 13 is a corresponding plan with the motor 1 omitted.

Fig. 14 is an end elevation to a larger scale than that of Figs. 12 and 13.

Referring first to Figs. 1, 2 and 3;—

In this, as in the other modifications, the main gyrating wheel C is an externally toothed wheel gearing with the internally toothed wheel B' which is keyed by the key $b$ to the driven shaft B; the pitch line diameter of the wheel B' is somewhat greater than that of the main gyrating wheel C, and the latter is mounted on an eccentric $c1$ keyed by the key $c2$ to the driving shaft A, so that as the centre of the wheel C is rotated its teeth engage with the internal teeth of the wheel B'.

The speed of rotation of the shaft A is usually constant so that the centre of the gyrating wheel is rotated at corresponding constant speed, and the speed of the driven shaft B is varied by controlling the speed of rotation of the main gyrating wheel C, about its centre. D is a sleeve rotatably mounted on the driving shaft A and an auxiliary gyrating wheel E is mounted on an eccentric $e1$ keyed to the sleeve D or as shown, made integral therewith. The gyrating wheel E gears with a fixed internally toothed wheel F, which is secured by the screws $f1$ to the fixed bracket K which forms a bearing for the sleeve D.

The speed of rotation of the auxiliary gyrating wheel E, since it gears with the fixed internal toothed wheel F, is determined by the speed of rotation of its eccentric $e1$, that is to say, by the speed of the sleeve D which is determined by gearing the sleeve D to the driving shaft A through a secondary speed change gear by which the speed of the sleeve D may be varied, for example, a secondary speed changing gear such as P, Q, R, S, as will be described later.

The auxiliary gyrating wheel E is connected to the main gyrating wheel C by means which whilst permitting the relative radial movement between the wheels C and E, couples those wheels together.

In this modification a series of pins $c6$ are fixed to the main gyrating wheel C and engage holes $e6$ in the wheel E, the diameters of which holes are substantially larger than the diameter of the pins.

An Oldham coupling may be employed to couple the wheels C and E together when it is essential to eliminate cylincal variation, as shown for example in Figs. 8 and 9.

There is a speed of rotation of C and E, determined by the setting of the secondary variable speed gear between D and A, at which the driven shaft is stationary; and by increasing or diminishing the said speed the shaft E may, within limits, be rotated at varying slow speed in one direction or the other, the change being made by continuous variation.

Referring now to Figs. 4, 5, 6 and 7:—

A is the driving shaft, one end of which is mounted preferably in ball bearings in the bracket L, and the other end of which has a spigot $a1$ carried in ball bearings $a2$, the outer race of which is held in alignment with the driven shaft which is supported in the bracket M. C is the main gyrating wheel mounted on the eccentric $c1$ preferably by means of a ball or roller bearing $c6'$; the eccentric $c1$ is keyed by the key $c2$ to the driving shaft A. B' is a main internally toothed wheel keyed to the driven shaft B and with which the teeth of the gyrating wheel C gear. K is an intermediate fixed bracket which with the brackets L and M is secured on the base plate Z.

D is a sleeve as described in the previous modification which is concentrically mounted on the driving shaft A, being in this modification supported by ball or roller bearings $d7$ carried by the bracket K, and by sleeves $d5$ and $d6$ in which the shaft A is journalled, and driven continuously by any suitable variable speed changing gear, the gear illustrated comprising coned friction members P and Q, R and S (see Fig. 13) which will be described more fully later; two elements P and S of the gear P, Q, R, S, are shown in Fig. 4.

The auxiliary gyrating wheel E, is mounted by a ball or roller bearing $e2$ on an eccentric $e1$ formed on the sleeve D. The auxiliary gyrating wheel gears with an internally toothed wheel F fixed to the bracket K by the screws $k6$.

Interposed between the two gyrating wheels is a coupling O4 which may be conveniently journalled on the shaft A by the ball or roller bearings $o6$; the coupling O4 (see Fig. 7) has a series of holes or slots $o7$ to take the pins $c7$ fixed to the main gyrating wheel C, and a corresponding series of slots or holes O8 to take corresponding pins $e7$ (see Fig. 6) carried by the auxiliary gyrating wheel E so that the two gyrating wheels are coupled through the coupler O4 by pin and slot connections which permit relative radial movement between them.

The wheel C the wheel E and the Oldham coupling (see Figs. 5, 6, and 7) are preferably lightened by drilling in each of them holes L.

Referring now to Figs. 8, 9, 10 and 11:—

In this case the driving shaft A, sleeve D, driven shaft B, the main gyrating wheel C, eccentric $c1$, auxiliary gyrating wheel E, eccentric $e1$, fixed wheel F and bracket K are arranged as described in connection with Fig. 11. The wheels C and E are connected together either by a single Oldham coupling or by a duplicate Oldham coupling comprising discs O5, O6, O7.

The disc O5 has projections $o10$ (see Figs. 10 and 11) engaging with slots $e10$ (see dotted lines Fig. 10) formed in the wheel E, and projections $o11$ engaging with slots $o14$ in the disc O6 which is mounted freely on the shaft A. The disc O7 has projections $o12$ engaging slots $c10$ in the wheel C, and projections $o13$ engaging in slots $o15$ (see dotted line Fig. 9) in the disc O6.

The gyrating wheels C and E are shown in Fig. 8 as being journalled directly in their eccentrics, and the sleeve D as journalled in the bracket K; ball races such as $c6'$, $e2$ and $d7$ would be fitted as shown in Fig. 4.

Referring now to Figs. 12, 13 and 14 which show the general arrangement of the preferred form;—

P, Q, R and S (see Fig. 13) comprise two pairs of meshing friction cones; the single cone member P is keyed to the shaft A and the two parts of the double cone members Q are feathered on a lay shaft T carried in pairs of levers $t1$ keyed to a rocket shaft $t2$ mounted in bearings $t3$.

The single cone R is keyed to the shaft T, and the two parts of the double cone S are feathered on the sleeve D.

There is keyed to the shaft $t2$ a lever V carrying at its upper end a quadrantral portion, $v1$, of a worm wheel, gearing with the worm $v2$ keyed to the shaft $v3$ carried in brackets $v4$ mounted on a cross beam $v5$; the worm is rotated by a handle $v6$.

The members P and Q are provided with double cone friction surfaces such as $p1$ and $r1$ respectively adapted to fit between the cone surfaces $q1$ and $s1$ of the double members Q and S. Each of the members S is as stated feathered to the sleeve D, the one member being held against axial movement by a collar $s6$ and the other member being pressed into contact with its fellow member by a spring $s7$ abutting at one end against a plate $s8$, the thrust of which is taken by the ball race $s9$; in like manner one of the members Q on the lay shaft is held against axial motion by the collar $q6$ and the other member is pressed against its fellow member by a spring (not shown) abutting against the collar $q8$.

It will be seen that the velocity ratio between the shaft A and the sleeve D may be varied by the operation of the handle v6 of the worm v2, which by engagement with the threads at the ends of the lever B, moves the shaft T laterally to-and-fro relatively to the driving shaft A, movement of the shaft T away from the shaft A, reducing, and movement of the shaft T towards the shaft A increasing the velocity ratio between A and D.

W is a chain wheel mounted on the driven shaft B by which the latter shaft is connected to the machine to be driven. I, Fig. 12, is an electric motor bolted to the bed plate Z and arranged in alignment with and having its shaft i1 coupled in any convenient manner to the shaft A.

In a modification a single Oldham coupling such as O5 may be employed, the teeth o12 which engage in the slots c10 in the main gyrating wheel C, the teeth o10 of which engage in the slots c10 in the wheel E.

In the arrangements described, when the rotation of the main gyrating wheel is restrained by the secondary speed changing gear, the reaction is transmitted as the torque through the said gear to the driving shaft, so that the energy so transmitted is not wasted.

The gearing described may be employed to gear a shaft running in the one direction at a comparatively high speed, to a part which requires to be driven in one or other directions at a comparatively slow speed.

The parts such as the wheel B, the wheel J and the couplings O3, O4, which rotate concentrically with the driving and driven shafts have their peripheral portions utilized to form an enclosing casing, an oil-tight running joint being made between the abutting portions which run at different speeds; this arrangement provides a casing which encloses the gear and retains the lubricating oil.

Other types of secondary variable speed gear may be employed and where the gear changes may be made persaltum, ordinary speed changing gear boxes may be employed in place of the gear P, Q, R, S.

The details of construction may be varied in accordance with the size and duty of the gear.

Having now fully described our invention, we declare that what we claim and desire to secure by Letters Patent is:—

1. In speed changing gear, in combination:—a driving shaft; a driven shaft; an eccentric on the driving shaft; a gyrating spur wheel mounted on the said eccentric; a toothed wheel on the driven shaft gearing with the said gyrating wheel; a rotating control member; secondary speed changing gear connecting the said control part to the driving shaft; an eccentric on the control member; an auxiliary gyrating wheel mounted on the said eccentric; a fixed wheel with which the auxiliary gyrating wheel gears, and means connecting the auxiliary gyrating wheel to the main gyrating wheel adapted to prevent relative rotary movement between them.

2. In speed changing gear, in combination:—a driving shaft; a driven shaft; an eccentric on the driving shaft; a gyrating spur wheel mounted on the said eccentric; a toothed wheel on the driven shaft gearing with the said gyrating wheel; a rotating control member; secondary speed changing gear connecting the said control member to the driving shaft; an eccentric on the control member; an auxiliary gyrating spur wheel mounted on the said eccentric; a fixed spur wheel with which the auxiliary gyrating wheel gears; and an Oldham coupling device connected between the main and the auxiliary gyrating wheels.

3. In speed changing gear, in combination, a driving shaft, a driven shaft, an eccentric on the driving shaft, a gyrating spur wheel mounted on the said eccentric, a toothed wheel on the driven shaft gearing with the said gyrating wheel, a control member in the form of a sleeve rotatably mounted on the driving shaft, secondary speed changing gear connecting the said control member to the driving shaft, a part driven by the control member, and means connecting the said part to the gyrating wheel so as to prevent relative rotation between the said part and wheel, said variable speed gear comprising a lay shaft rotatably mounted parallel to the driving shaft in bearings by means of which its distance from the driving shaft may be varied, and two pairs of meshing coned friction discs, the depth of mesh of which determines the velocity ratio, the control part being driven from the lay shaft through one pair of said discs, and the lay shaft being driven by the driving shaft through the other pair of said discs.

4. In speed changing gear, in combination;—a driving shaft; a driven shaft; an eccentric on the driving shaft; a gyrating spur wheel mounted on the said eccentric; a toothed wheel on the driven shaft gearing with the said gyrating wheel; a rotating control member; secondary speed changing gear connecting the said control member to the driving shaft; an eccentric on the control member; an auxiliary gyrating spur wheel mounted on the said eccentric; a fixed spur wheel with which the auxiliary gyrating wheel gears; and an Oldham coupling device connected between the main and the auxiliary gyrating wheels; the said control member being a sleeve rotatably mounted on the driving shaft; and the said auxiliary speed changing gear comprising a lay shaft parallel with the driving shaft and rotatably mounted in means by which its distance from the driving shaft may be varied, and two pairs of meshing friction cone discs, the depth of mesh of which determine the velocity ratio, one pair connecting the driving shaft to the lay shaft and one pair connecting the lay shaft to the control member.

5. In apparatus as claimed in claim 2, in which the secondary speed varying gear comprises a pair of friction discs having adjacent conical surfaces, one disc fixed to, and the other feathered on the control member, a spiral spring pressing the said discs together, a lay shaft rotatably mounted parallel to the driving shaft in bearings which can be moved transversely relatively to the driving shaft, a friction disc having a conical periphery keyed on the lay shaft and meshing between the discs mounted on the control shaft, and so varying the velocity ratio; a pair of friction discs like the first mentioned discs and similarly mounted on the lay shaft, and a friction disc having a cone periphery keyed to the driving shaft and meshing with the last mentioned pair of friction discs and so varying the velocity ratio.

In testimony whereof, we have set our hands.

JOHN STANDEN SHAW.
WALTER HEAP.